Apr. 10, 1923.
C. C. HANSEN
1,451,363
LUG CHUCK FOR ROCK DRILLS
Filed May 5, 1922
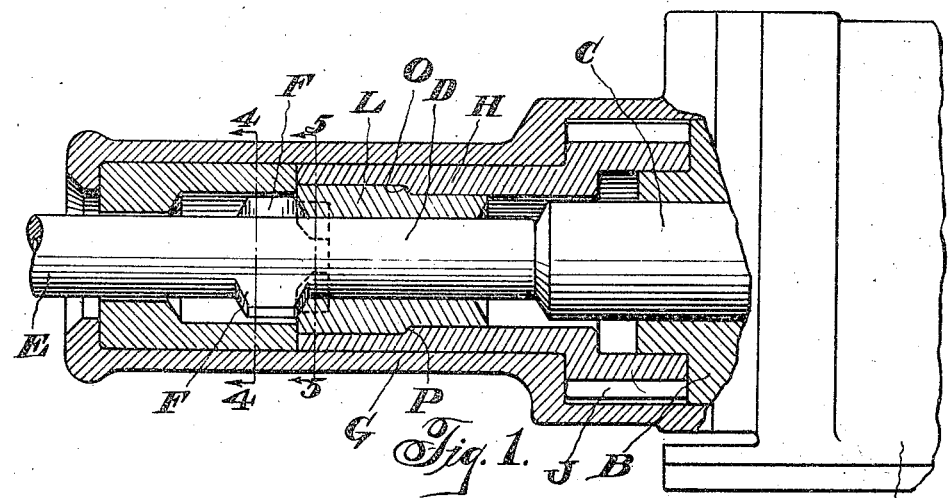
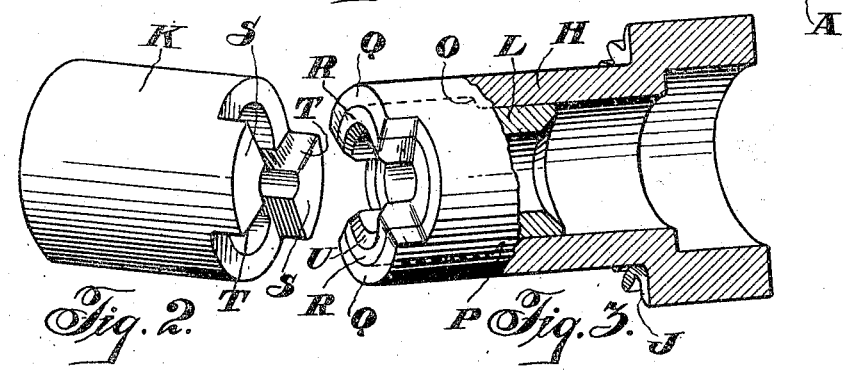
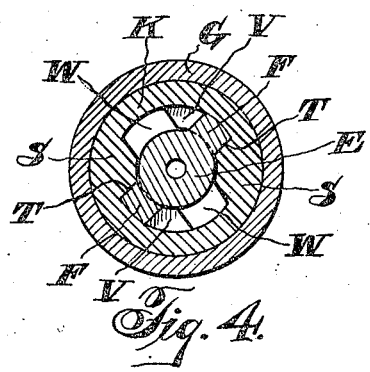 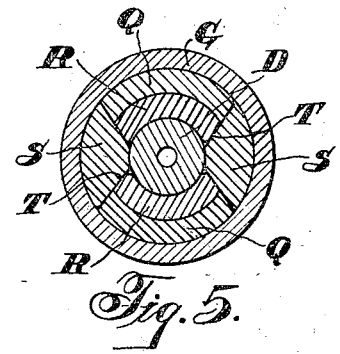
Inventor
Charles C Hansen
By his Attorney
Herbert G Ogden Patented Apr. 10, 1923.

1,451,363

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

LUG CHUCK FOR ROCK DRILLS.

Application filed May 5, 1922. Serial No. 558,689.

*To all whom it may concern:*

Be it known that I, CHARLES C. HANSEN, a citizen of the United States, and a resident of Easton, in the county of Northampton and State of Pennsylvania, have invented a certain Lug Chuck for Rock Drills, of which the following is a specification, accompanied by drawing.

This invention relates to fluid actuated rock drills of the hammer type, but more particularly to a lug chuck for such machines adapted to receive lug steel and impart rotation thereto.

The objects of the invention are to simplify and strengthen the chuck, enable the parts of the chuck to be readily assembled in the machine and disassembled, and produce a construction in which wear and breakage are reduced to a minimum.

My improved lug chuck is capable of use with any form of automatic rotation, in which a chuck sleeve is rotated, for imparting rotation to a drill steel having lugs which engage a driver, but in the present instance, I have chosen to show a chuck having a gear adapted to be rotated by means of any suitable independent rotation motor.

In the drawings, which illustrate the invention in one of its preferred forms,

Figure 1 is a longitudinal sectional elevation partly broken away of the front end of a rock drill embodying the invention.

Figure 2 is a perspective view of the driver,

Figure 3 is a perspective view partly broken and partly in longitudinal section of the chuck sleeve, Figure 4 is a transverse sectional view on the line 4—4 of Figure 1, looking in the direction of the arrows, and Figure 5 is a transverse sectional view on the line 5—5 of Figure 1, looking in the direction of the arrows.

Referring to the drawings, the cylinder A of a rock drill is indicated having the front cylinder washer B through which the hammer piston C reciprocates and imparts blows of impact to the shank D of the drill steel E having the lugs F. The machine is provided with a front head G containing the chuck parts which include the chuck sleeve H adapted to be rotated as by means of the gear J, and the driver K with which the lugs F on the steel engage.

The chuck bushing L is inserted within the forward end of the chuck sleeve H and in this instance, the chuck bushing is preferably constructed with a shoulder O intermediate its length, adapted to bear against an internal shoulder P in the bore of the chuck sleeve H, to resist the rearward thrust and impact of the lugs F of the drill steel upon the bushing.

In accordance with my invention, both the chuck sleeve H and the chuck bushing L are formed with registering clutch jaws Q and R respectively, and the driver K is formed with clutch jaws S cooperating with said clutch jaws Q and R. The driver K is also provided with internal lugs T, preferably formed in alignment with and as a part of said driver clutch jaws S, with which the lugs F of the drill steel cooperate. The lugs T engage the lugs F on the steel and lock the steel in driving position, since the steel cannot be withdrawn without rotating it backwards through the arc of a circle in order to bring the lugs F past the shoulder V and opposite the slots W, cut in the shoulders. The forward end U of the chuck bushing L is preferably beveled, to receive the beveled surface of the lugs F of the drill steel.

I claim:

1. A lug chuck for fluid actuated rock drills of the hammer type, comprising a chuck sleeve adapted to be rotated, a removable cylindrical chuck bushing within the forward end of said sleeve seated against an internal integral shoulder on said sleeve, through which the shank of the drill steel is adapted to extend in position to receive the impact blows of the hammer piston of the machine, clutch jaws formed in both the chuck sleeve and the chuck bushing, and a driver having clutch jaws cooperating with the clutch jaws in both the chuck sleeve and chuck bushing.

2. A lug chuck for fluid actuated rock drills of the hammer type, comprising a chuck sleeve adapted to be rotated, a removable cylindrical chuck bushing within the forward end of said sleeve seated against an internal integral shoulder on said sleeve, through which the shank of the drill steel is adapted to extend in position to receive the impact blows of the hammer pistons of the machine, clutch jaws formed in both the chuck sleeve and the chuck bushing, and a driver having clutch jaws cooperating with the clutch jaws in both the chuck sleeve and chuck bushing, and also provided with internal lugs formed in alignment with and as a part of the said driver clutch jaws.

3. A lug chuck for fluid actuated rock drills of the hammer type, comprising a chuck sleeve adapted to be rotated, a removable cylindrical chuck bushing within the forward end of said sleeve seated against an internal integral shoulder on said sleeve, through which the shank of the drill steel is adapted to extend in position to receive the impact blows of the hammer piston of the machine, clutch jaws formed in both the chuck sleeve and the chuck bushing, and a driver having clutch jaws cooperating with the clutch jaws in both the chuck sleeve and chuck bushing, said driver having internal lugs adapted to engage the lugs on the steel and lock the steel in driving position.

In testimony whereof I have signed this specification.

CHARLES C. HANSEN.